United States Patent
Xu et al.

(10) Patent No.: US 9,516,229 B2
(45) Date of Patent: Dec. 6, 2016

(54) SYSTEM AND METHOD FOR ADJUSTING ORIENTATION OF CAPTURED VIDEO

(71) Applicant: QUALCOMM Incorporated, San Diego, CA (US)

(72) Inventors: Wentao Xu, Markham (CA); Gang Qiu, Markham (CA); Xiaopeng Zhang, Richmond Hill (CA); Xiaoming Zhou, Markham (CA); Farrukh Qurashi, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 13/686,466

(22) Filed: Nov. 27, 2012

(65) Prior Publication Data

US 2014/0146205 A1     May 29, 2014

(51) Int. Cl.
*H04N 5/232*     (2006.01)

(52) U.S. Cl.
CPC ...... *H04N 5/23267* (2013.01); *H04N 5/23258* (2013.01)

(58) Field of Classification Search
CPC ............... H04N 5/23248; H04N 5/23258; H04N 5/272; H04N 5/23267
USPC .............................................. 348/208.2, 239
See application file for complete search history.

(56) References Cited

U.S. PATENT DOCUMENTS

| | | | |
|---|---|---|---|
| 5,900,909 A * | 5/1999 | Parulski et al. | 348/231.6 |
| 6,262,769 B1 * | 7/2001 | Anderson et al. | 348/333.1 |
| 6,286,873 B1 * | 9/2001 | Seder | 283/117 |
| 6,597,817 B1 * | 7/2003 | Silverbrook | 382/289 |
| RE38,896 E * | 11/2005 | Anderson | 348/272 |
| 7,030,912 B1 * | 4/2006 | Honma | 348/222.1 |
| 8,098,981 B2 * | 1/2012 | Seo et al. | 396/50 |
| 8,605,162 B2 * | 12/2013 | Ejima et al. | 348/220.1 |
| 8,723,890 B2 * | 5/2014 | Griffin et al. | 345/649 |
| 8,743,219 B1 * | 6/2014 | Bledsoe | 348/208.4 |
| 9,001,047 B2 * | 4/2015 | Forstall et al. | 345/173 |
| 2003/0152291 A1 * | 8/2003 | Cheatle | 382/296 |
| 2004/0141085 A1 * | 7/2004 | Nickel et al. | 348/333.11 |
| 2004/0212699 A1 * | 10/2004 | Molgaard | 348/231.99 |
| 2004/0263428 A1 * | 12/2004 | Sudo | 345/7 |
| 2005/0093891 A1 * | 5/2005 | Cooper | 345/649 |
| 2006/0078214 A1 | 4/2006 | Gallagher | |
| 2007/0047187 A1 * | 3/2007 | Kumano et al. | 361/681 |

(Continued)

OTHER PUBLICATIONS

Sony Corp; GB 201306083; May 2013; Method and Apparatus; Abstract.*

(Continued)

*Primary Examiner* — Roberto Velez
*Assistant Examiner* — Cynthia Segura
(74) *Attorney, Agent, or Firm* — Knobbe Martens Olson & Bear, LLP

(57) ABSTRACT

Described herein is a system and method for adjusting the orientation of captured video utilizing the data received from a built-in inertial measurement unit such as an accelerometer. During video capture, the device may be held in a position that is not fully vertical or horizontal, and thus not match the true orientation of a scene. This can cause the captured video to appear rotated during playback at the same angle of rotation as the video capture device. The described system can adjust the playback orientation of the rotated video by utilizing sensor data captured during the same time as the video was captured.

20 Claims, 4 Drawing Sheets

(56) References Cited

U.S. PATENT DOCUMENTS

| | | |
|---|---|---|
| 2009/0040308 A1 | 2/2009 | Temovskiy |
| 2011/0128350 A1* | 6/2011 | Oliver .................... H04N 5/232 |
| | | 348/36 |
| 2011/0128410 A1* | 6/2011 | Lee ........................ H04N 5/772 |
| | | 348/231.99 |
| 2011/0149094 A1 | 6/2011 | Chen et al. |
| 2011/0211082 A1 | 9/2011 | Forssen et al. |
| 2011/0228098 A1* | 9/2011 | Lamb .................... G01S 17/023 |
| | | 348/164 |
| 2011/0228112 A1 | 9/2011 | Kaheel et al. |
| 2011/0234825 A1 | 9/2011 | Liu et al. |
| 2012/0086819 A1 | 4/2012 | Wilson et al. |
| 2012/0262540 A1* | 10/2012 | Rondinelli et al. ............. 348/36 |
| 2013/0044228 A1* | 2/2013 | Corey et al. ................ 348/208.2 |
| 2015/0264269 A1* | 9/2015 | Yuan .................... H04N 5/2256 |
| | | 348/241 |
| 2015/0288949 A1* | 10/2015 | Kubota .............. H04N 13/0239 |
| | | 348/47 |

OTHER PUBLICATIONS

Grundmann M., et al., "Calibration-free rolling shutter removal", Computational Photography (ICCP), 2012 IEEE International Conference on, IEEE, Apr. 28, 2012 (Apr. 28, 2012), pp. 1-8, XP032185752, DOI: 10.1109/ICCPHOT.2012.6215213 ISBN: 978-1-4673-1660.

International Search Report and Written Opinion—PCT/US2013/069860—ISA/EPO—Jan. 3, 2014.

* cited by examiner

Read Accelerometer Unit Data Process

Adjust Video Orientation Based On Matrix Process

SYSTEM AND METHOD FOR ADJUSTING ORIENTATION OF CAPTURED VIDEO

BACKGROUND

Field of the Invention

The present invention generally relates to systems and methods for adjusting the orientation of captured video of an object in a scene by utilizing accelerometer data built into the video recording device.

Background

Typically, in a camcorder's preview or in the local view of a video telephony (VT) application, an object's image orientation is always the same as the object's true orientation in the scene, regardless of the device's orientation.

However, when frames are encoded, the object's image orientation in each frame is dependent on the device's orientation at the moment when the frame was captured, which does not necessarily match the object's true orientation in the scene. Therefore, if the device is rotated by an angle θ when capturing an object, in the recorded video the object's view will also be rotated by the angle θ, instead of presenting the object's true orientation in the captured scene.

SUMMARY

In one embodiment, the invention provides a method for encoding a video captured on a video capture device. The method comprises reading orientation data from the video capture device as a video of a scene is being captured. The method further comprises generating a rotation matrix based on the orientation data. The method further comprises adjusting the orientation of the captured video to match the true orientation of the scene. The method further comprises encoding the adjusted captured video. In another embodiment, the invention provides a system for encoding a video capture on a video capture device. The system comprises an image sensor configured to capture a video of a scene. The system further comprises an inertial measurement unit configured to provide orientation data from the video capture device. The system further comprises a rotation module configured to generate a rotation matrix based on the orientation data and adjust the orientation of the captured video to match a true orientation of the scene. The system further comprises an encoder configured to encode the adjusted captured video. In another embodiment, the invention provides a system for encoding a video captured on a video capture device. The system further comprises means for reading orientation data from the video capture device as a video of a scene is being captured. The system further comprises means for generating a rotation matrix based on the orientation data. The system further comprises means for adjusting the orientation of the captured video to match the true orientation of the scene. The system further comprises means for encoding the adjusted captured video.

DETAILED DESCRIPTION

Embodiments of the invention relate to systems and methods for adjusting the orientation of a captured video based on data collected from sensors associated with the video capture device. For example, the orientation of a captured video may be adjusted based on orientation data captured from a gravity sensor, or an accelerometer unit built into the video capture device. In particular, most modern day mobile phones include a built-in camera with video and image capturing capabilities. For example, a typical present day mobile phone camera may provide the capability to record videos at up to 30 frames per second.

Furthermore, mobile phones frequently comprise an accelerometer built into the device for user interface control. The accelerometer measures the force applied to the device at a moment in time. These forces may be used to determine in which direction the user is moving the device and thus provide orientation data. An acceleration value is expressed as a 3-dimensional vector representing the acceleration components in the X, Y and Z axes. The orientation of the acceleration may be relative to the device such that −1 g is applied in the Z-axis when the device is face up on a level table and −1 g is applied along the Y-axis when the device is placed perpendicular to a table top. The accelerometer may be used to present landscape or portrait views of images or videos on the device's screen based on the orientation of the phone, or how the device is being held by a user.

During video recording, as discussed above, the orientation of the captured video does not necessarily match the captured object's "true orientation" in the scene. For example, if the video recording device is tilted or rotated through an angle during recording, the captured video will be rotated by that same angle as it is being played back on the device. As a result, the recorded video can look "tilted" or "rotated" when the video is played back on the mobile device screen while being held in a normal vertical or horizontal orientation. Furthermore, if the video is transmitted or stored for playback on another device (such as a television), the video would also appear to be rotated, or tilted, by the same angle it was tilted during recording on the mobile device. However, as discussed herein, embodiments can use data captured from video device sensors to orient the device properly for playback. As one example, once the accelerometer data is read, that data may be utilized to calculate a rotation matrix to correct the tilted video orientation so that the video will be encoded in a way to be played back in a normal orientation.

Figure 1:
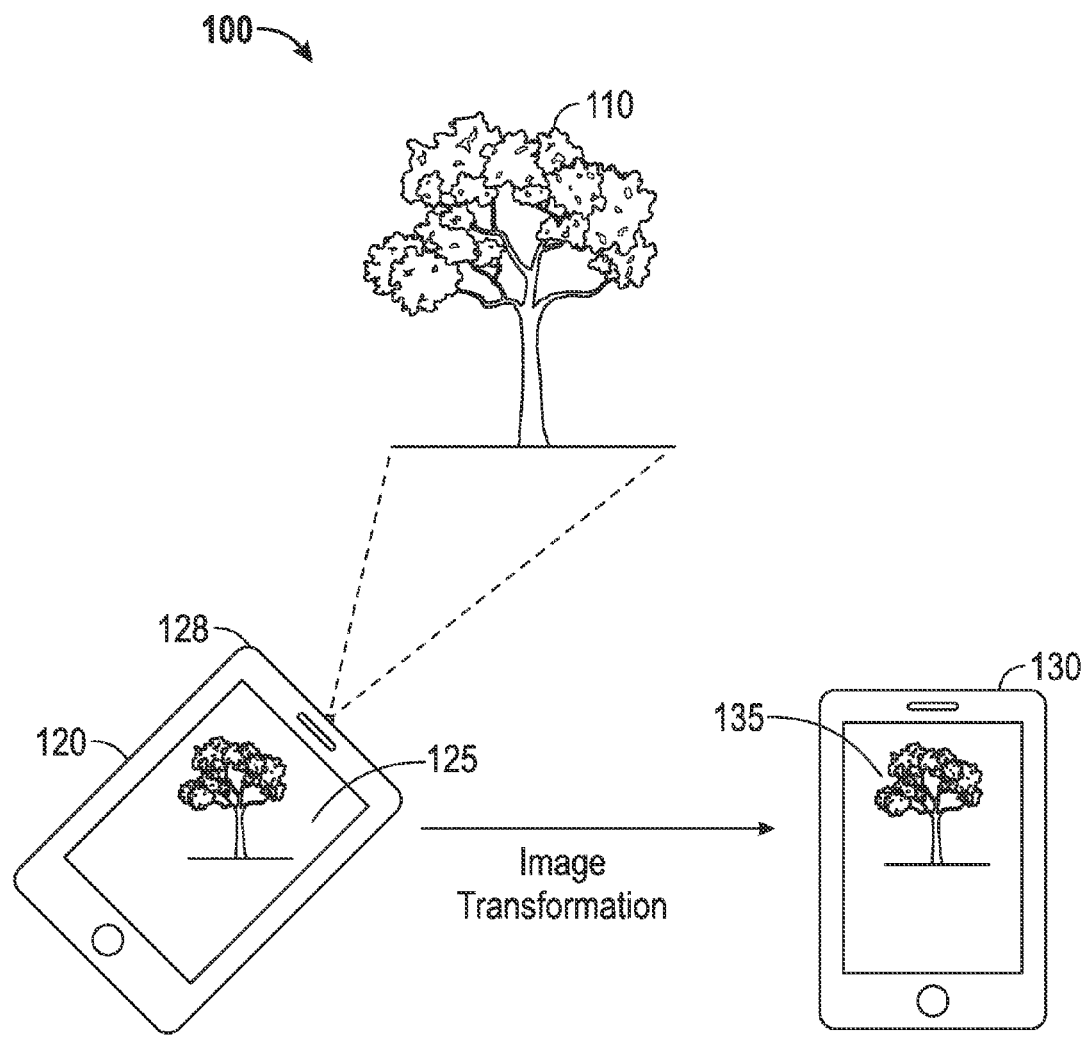
FIG. 1 is an illustration of a scene capture and an image transformation on a display screen according to one embodiment of the present invention.

FIG. 1 is an illustration of one embodiment of a scene 100 showing a rotated orientation of a tree 110 being recorded by a video capture device 120. The video capture device 120 may comprise a mobile phone, a tablet PC, digital camera, or any recording device comprising a built-in position sensor, such as an accelerometer or inertial measurement unit.

As shown, the video capture device 120 is tilted at an angle while recording the tree 110. Video capture device 130 can be the same device as video capture device 120, or another device, and includes embodiments described herein that rotate captured images based on the position of video capture device 120. As shown, the device 130 shows the tree 110 being recorded without any tilt, such that the orientation of the device 130 matches the captured tree's true orientation in the scene 100. As shown on the screen 125 of video capture device 120, the orientation of the tree 110 is orientated such that the top of the tree shown on the screen 125 points towards, or is rotated towards the top left portion 128 of the video screen 125. In the absence of the orientation adjustment system described herein, the image of the top of the tree 110 would continue to point to the top left portion of the device 130 even when held in a vertical position.

Thus, embodiments correct this display defect by reading data from the video capture device's built-in accelerometer or inertial measurement unit. The data may be used to derive a rotation matrix that rotates the captured object during video encoding so that the final video will match the object's true orientation on screen. As shown in device 130, after the image transformation, a screen 135 shows the tree's orientation pointing upwards along the vertical axis (at a 12 o'clock position), which matches the object's true orientation.

Figure 2:
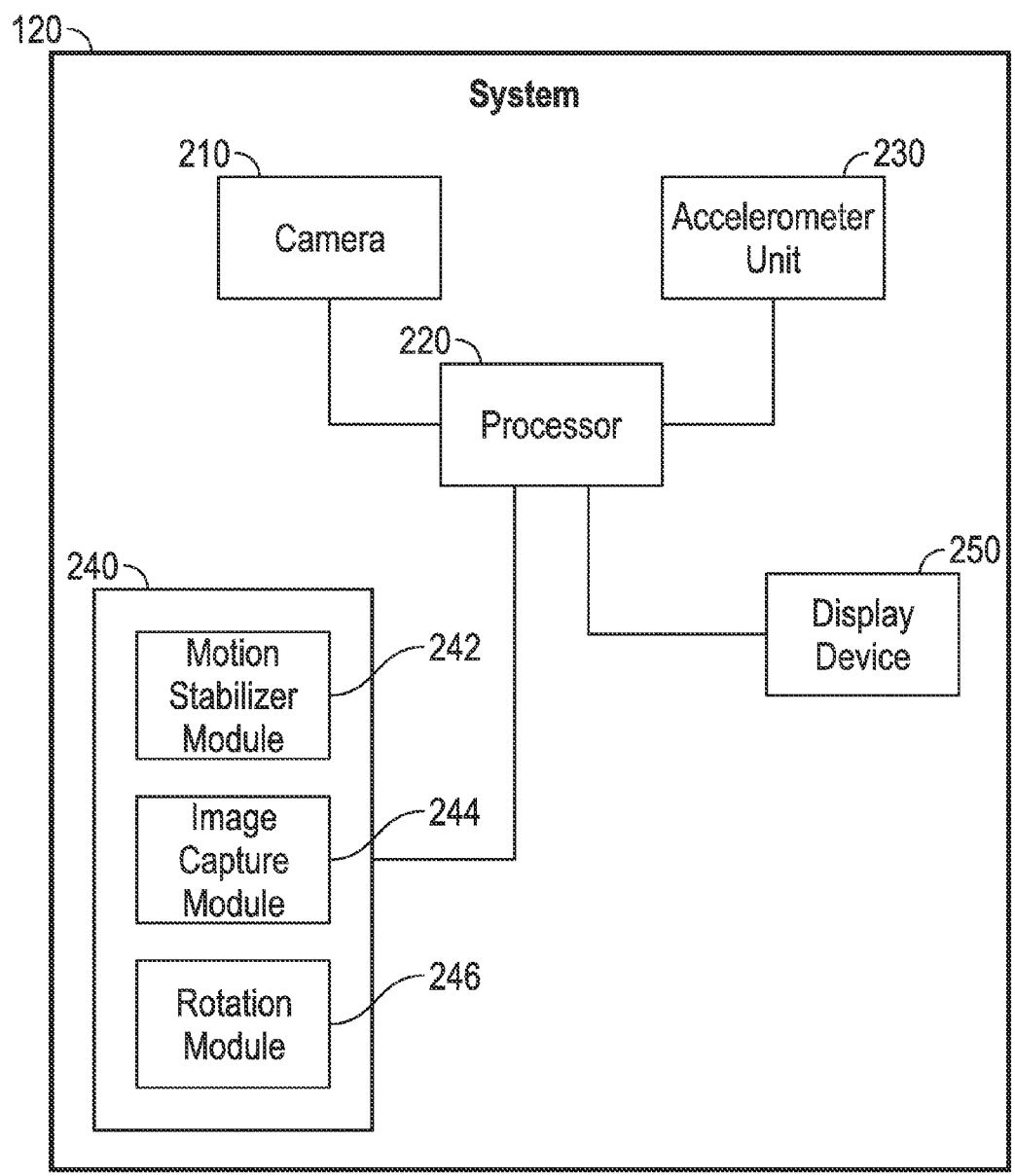
FIG. 2 is a block diagram of a system level overview according to one embodiment of the present invention.

FIG. 2 is a block diagram of the system 120 of FIG. 1. A camera 210 provides the capability to capture an image of a scene, or video at different frame rates. For example, the camera 210 may capture video at a frame rate of 30 frames per second. The camera is connected to a processor 220 which works in conjunction with an accelerometer unit 230 that measures the accelerometer readings of the video capture device 120. The accelerometer unit 230 may also consist of a 3-axis gyroscope in lieu of an accelerometer to derive the spatial orientation of the video capture device to use in adjusting the orientation of the captured video.

The processor 220 may derive a direction cosine matrix, or rotation matrix to correct for the rotation of the video capture device during recording. A set of system modules 240 is shown that act together within the system to provide many of the functions of adjusting the orientation of the captured video. A motion stabilizer module 242 may stabilize the image or video during recording, and use the accelerometer unit 230 data for anti-blur functionality. The image capture module 244 may process each frame of video captured by the camera 210 and work in conjunction with the rotation module 246 to calculate a rotation matrix for the orientation adjustment of the current frame. The rotation module 246 may be configured to read the accelerometer or inertial measurement unit data from the accelerometer unit 230 to derive a rotation matrix that adjusts the orientation of the captured video on a frame-by-frame basis. A display device 250 may then display the orientation adjusted captured video or display the unadjusted orientation video.

Figure 3:
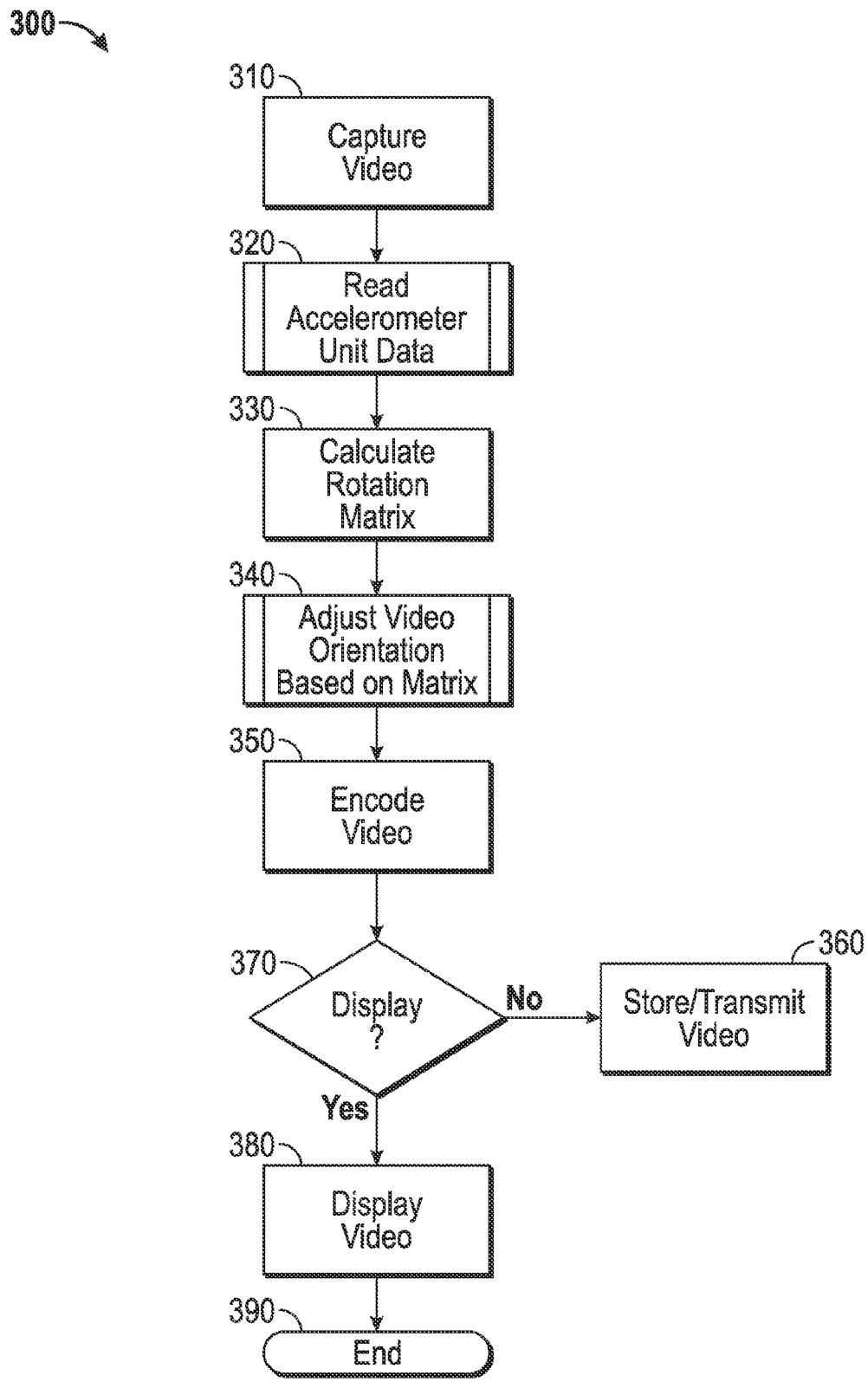
FIG. 3 is a flow diagram showing an overview of a process for orientation adjustment of captured video.

FIG. 3 is a flow diagram showing one embodiment of a process 300 for adjusting the orientation of captured video, as discussed herein. The process 300 begins at a block 310 wherein video to be adjusted is captured or provided to the device. The video may be provided as a sequence of frames, or as static images of a scene. The process 300 then continues to process block 320 to read the accelerometer unit data. As discussed above, the accelerometer unit may also comprise a 3-axis gyroscope in lieu of an accelerometer to derive the data used to calculate a rotation matrix. The steps undertaken in the process block 320 will be discussed in greater detail with respect to FIG. 4 below.

Once the accelerometer data is read from the video capture device in process block 320, the process 300 continues to block 330 to calculate a rotation matrix to adjust the captured video's orientation. The derived rotation matrix may be updated for each video frame, or every certain number of frames, depending on the movement of the video capture device during recording. The accelerometer sensor readings may also be filtered using a low pass filter to remove the jittering, and then processed to derive a rotation matrix. As an example, the accelerometer axes may be defined as follows: the Y-axis may run along the vertical direction of the video capture device, with the positive direction facing north (at a 12 o'clock position); the X-axis may run along the horizontal direction of the video capture device, with the positive direction facing east (at a 3 o'clock position); the Z-axis may run through the video capture device, with the positive direction facing upwards through the top of the device (such that the rotation of the device would be along the Z-axis).

When the user is tilting the video capture device during recording, the present invention only involves the rotation along the X and Y plane, and therefore the Z-axis accelerometer readings do not need to be incorporated in deriving the rotation matrix. When the video capture device is held in a normal position, and assuming the video capture device is also oriented to match the captured object's orientation (see the orientation of video capture device 130 in FIG. 1, which would represent a "normal" orientation and also matching the orientation of the captured tree 110), the positive Y-axis runs along the direction of gravity.

Thus, the Y-axis of the 3-axis accelerometer would measure the acceleration of gravity along the vertical direction (approximately 9.8 m/s$^2$). The measurement along the X-axis in a normal orientation as shown by video capture device 130 in FIG. 1, would be 0 since there is no tilt or rotation along the X-axis. Hence, in a normal position, the accelerometer vector reading would be (0, 9.8 m/s$^2$) and after normalization (dividing both X and Y axes by the gravitational acceleration) would be (0, 1).

Next, when the video capture device is rotated by an angle θ clockwise, the new orientation (as shown by video capture device 120 in FIG. 1), would have an accelerometer reading along the negative X-axis. After rotation by the user at an angle θ, the video capture device would now be oriented such that we may define new axes X' and Y', where X' runs along the bottom of the video capture device (rotated by the angle θ "below" the normal X-axis), and Y' runs along the left side of the video capture device (rotated by the angle θ to the "right" of the normal Y-axis). The relationship between the starting normal orientation of the video capture device in the X, Y plane at coordinates (X,Y) in the original "normal position", and a rotated orientation (as shown by 120 of FIG. 1) at coordinates (X', Y') can be as follows:

$$\begin{bmatrix} X \\ Y \end{bmatrix} = \begin{bmatrix} \cos(\theta) & \sin(\theta) \\ -\sin(\theta) & \cos(\theta) \end{bmatrix} \begin{bmatrix} X' \\ Y' \end{bmatrix}$$

Therefore, for a user induced rotation at an angle θ clockwise along the X-Y plane, the above rotation matrix may be used to adjust the captured image or frame into a "normal" or "true" orientation to match the captured scene or captured object's "true orientation". Furthermore, the above matrix may be updated on a frame by frame basis, since the rotation angle θ may vary as the video capture device is recording a scene. Also, a similar matrix may be calculated utilizing a 3-axis gyroscope, which measures the angular velocity, to also derive a matrix to correct for the rotation during recording of the video capture device.

The process 300 then continues to process block 340 to adjust the captured video based on the calculated rotation matrix from block 330. Process 340 will be discussed in greater detail below with respect to FIG. 5.

Next, the process 300 moves to block 350 and encodes the video using the adjusted orientation from process block 340.

The encoded video may be either saved in local memory, or transmitted thought a network for decoding on a receiver's side for video telephony applications or display purposes. Next, the process 300 moves to decision block 370 to determine whether to display the original (un-adjusted) video locally or not. If a determination is made to not display the video, then the process 300 moves to a block 360 to store or transmit the video. However, if a determination is made at decision state 370 to display the video, the process 300 moves to state 380 wherein it is displayed on the video capture device's built-in display screen, or an external display device before the process 300 ends at block 390.

Figure 4:
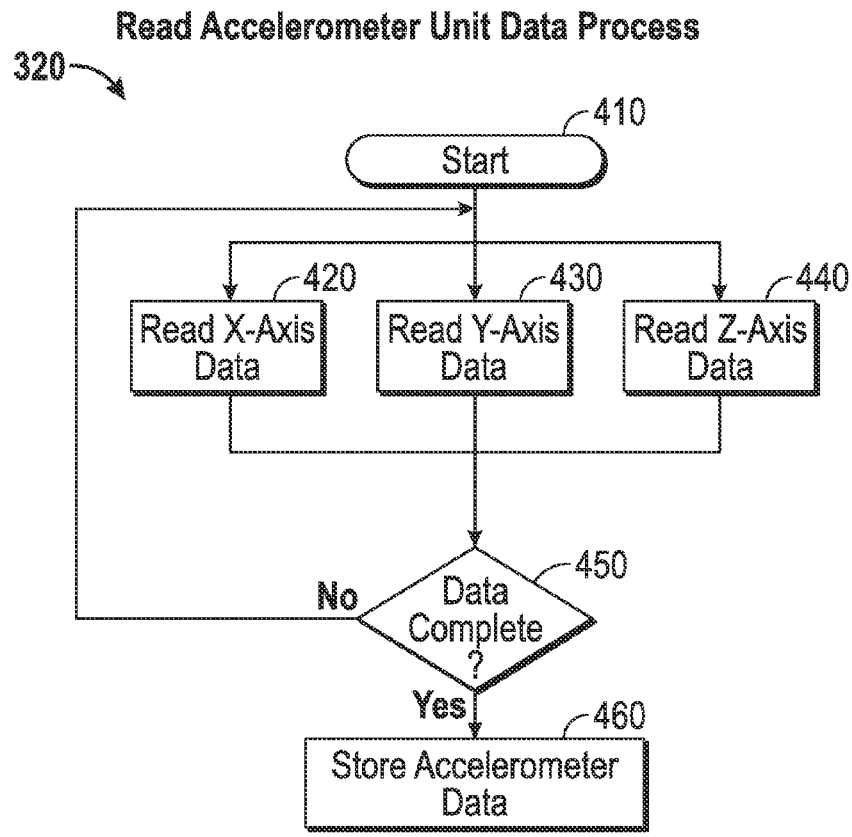
FIG. 4 is a flow diagram showing an overview of a process for reading data from an accelerometer unit.

FIG. 4 shows in further detail the process 320 for reading accelerometer unit data. During the capturing of each video frame, one or multiple reading of the accelerometer may be obtained. For a 3 axis accelerometer, a single reading will yield the acceleration vector with X, Y, Z components. As shown in FIG. 4, the X-Axis 420, Y-Axis 430 and Z-Axis 440 may be read simultaneously or individually. The direction of each axis is generally arbitrary, as long as the three axes follow the right-hand rule. The accelerometer measures the acceleration, or change in velocity of the device and calculates a corresponding X, Y and Z component for the acceleration vector. Unless the device is solely being accelerated along a single axis, the acceleration vector will likely have components in each of the three directions. The accelerometer may be configured at such a sampling frequency that at least one sample of the acceleration may be obtained during the capturing of a single video frame. If multiple acceleration readings are available during the period of capturing a single video frame, a low pass filter may be applied on these reading to remove any sampling noises or jitters caused by hand movements. If a gyroscope is also available, its readings may be used to remove the acceleration contributed by hand movement. Then multiple samples obtained during the capturing of a single video frame may be averaged to generate the single gravity vector for that video frame. Next, the gravity vector is projected onto device's X-Y plane (by dropping the Z component), and normalized, such that the resultant unit vector may be used to calculate the rotation matrix or rotation angle. As discussed above, the gravity component inside the X-Y plane is normally the only data needed to calculate the rotation matrix. In this embodiment, the Z component of the gravity is not required since it's not needed to calculate the rotation matrix used to rotate the captured image frames. Normally, the unit vector from the X-axis (block 420) will be $\sin(\theta)$ and along the Y-axis (block 430) will be $\cos(\theta)$, where $\theta$ is the angle of rotation of the video capture device rotated counter-clockwise. Next, the process continues to block 450 wherein a determination is made whether the unit vector is different enough from the previous frame's unit vector (the one stored). If the difference is smaller than a threshold, the process 320 returns to step 410. If the difference is bigger than the threshold, the process 320 moves to block 460 wherein the unit vector data is stored in a memory and the rotation matrix is updated accordingly.

Figure 5:
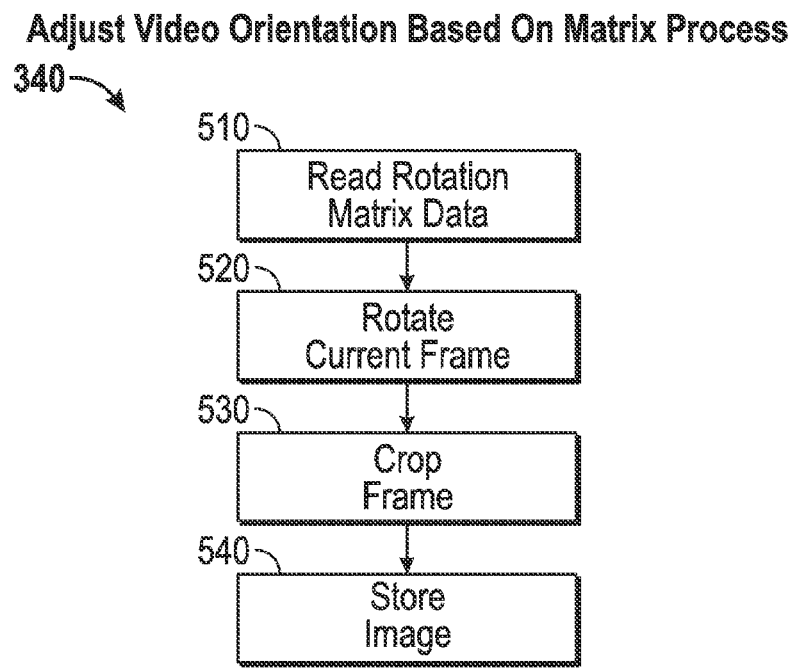
FIG. 5 is flow diagram showing an overview of a process for adjusting video orientation based on a rotation matrix.

FIG. 5 provides further details on the process 340 for adjusting the video orientation based on the calculated rotation matrix. The process 340 begins at block 510 which reads the rotation matrix to adjust the orientation of the currently displayed frame. As discussed above, the rotation matrix data may vary on a frame-by-frame basis as the video is being captured, since the orientation of the video capture device may vary during recording, and therefore the corresponding rotation matrix may also vary on a frame-by-frame basis. The process then continues to block 520 to rotate the current frame being captured.

To avoid resolution loss due to rotation, the camera or video capture device may be configured to capture frames with an extra margin, so that a cropping of each frame may be done after the rotation without losing important information from the scene of interest. For example, to capture a frame with a resolution of (w, h), the camera or video capture device is configured to capture frames with a resolution of (c, c). Therefore, the minimum value of c, or $c_{min}$ an be calculated as:

$$c_{min} = \sqrt{w^2 + h^2}$$

In practice, extra margin may be added for the filtering process, where m is the margin, so $c = c_{min} + m$. The rotation is around the geometric center of the image. One possible enhancement is to allow the rotation origin to move around in the small neighborhood of the image center, so that adjacent images may use the same key point in the scene as the rotation origin as much as possible. This can potentially remove jitters caused by hand shaking. Such an algorithm may start with the geometric center of the image, and when a matching key point is not found, falls back to the geometric center of the image.

To rotate an image by the angle of $\theta$ counter-clockwise, for each point (x', y') in the resultant image, it is rotated $\theta$ counter-clockwise, to find the matching point (x, y) in the original image. An interpolation method is used to estimate the value of the original image at (x, y), and assign that value to the point (x', y') in the resultant image. This process may be implemented using dedicated hardware blocks, or general purpose processing units, such as a Graphics Processing Unit (GPU). After each frame is rotated based on the rotation matrix data, the process 340 moves to block 530 to crop the rotated image or frame so that it appears in the proper orientation on a display screen. After cropping is performed, the current frame can have the intended output resolution. Finally, after the frame has been rotated and cropped, the process 340 is capable of storing the current frame with the corrected, or adjusted orientation in memory at block 540.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as a Pentium® processor, a Pentium® Pro processor, a 8051 processor, a MIPS® processor, a Power PC® processor, or an Alpha® processor. In addition, the processor may be any conventional special purpose processor such as a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®, UNIX® or Microsoft Windows®.

The system may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system may also be written using interpreted languages such as Perl, Python or Ruby.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A method of encoding a video captured on a video capture device at two orientations, comprising:
    reading orientation data for a first orientation from the video capture, device as a video of a scene is being captured, wherein the first orientation has a first resolution;
    determining that the video capture device is rotated to a second orientation as the video of the scene is being captured, wherein the second orientation has a second resolution;
    reading orientation data from the video capture device as a video of the scene is being captured when the video capture device is in the second orientation;
    generating a rotation matrix based on a relationship between the first orientation and the second orientation;
    adjusting the orientation of frames of the video captured when the video capture device is in the second orientation to match the orientation of the video captured when the video capture device is in the first orientation;
    cropping the adjusted frames of the video captured when the video capture device is in the second orientation, the cropped frames having the first resolution; and
    encoding the cropped frames of the captured video.

2. The method of claim 1, wherein the orientation data is inertial measurement data from an accelerometer or a gyroscope.

3. The method of claim 1, wherein the video capture device comprises a mobile phone or tablet.

4. The method of claim 1, further comprising storing the adjusted captured video to a memory in the video capture device.

5. The method of claim 1, wherein the rotated captured video is transmitted to another device with video display capability.

6. The method of claim 1, wherein the first orientation is a true orientation in which the acceleration of gravity aligns with a vertical axis of the of the video capture device.

7. The method of claim 1, wherein the rotation matrix includes a rotation angle determined by projecting gravity vectors of successive frames onto an X-Y plane of the video capture device.

8. The method of claim 7, wherein projecting the gravity vectors does not include projecting a Z-component of the gravity vector.

9. The method of claim 1, wherein the rotation matrix comprises a 2×2 matrix.

10. A system for encoding a video capture on a video capture device at two orientations, comprising:
    an image sensor configured to capture a video of a scene;
    an inertial measurement unit comprising at least one of an accelerometer or a gyroscope configured to provide orientation data from the video capture device as a video of a scene is being captured when the video capture device is in a first orientation and provide orientation from the video capture device as a video of a scene is being captured when the video capture device is rotated to a second orientation, wherein the first orientation has a first resolution and the second orientation has a second resolution;
    a processor executing a rotation module configured to:
        generate a rotation matrix based on a relationship between the first orientation and the second orientation,
        adjust the orientation of frames of the video captured when the video capture device is in the second orientation to match the orientation of the video captured when the video capture device is in the first orientation, and
        crop the adjusted frames of the video captured when the video capture device is in the second orientation, the cropped frames having the first resolution; and
    an encoder configured to encode the cropped frames of the captured video.

11. The system of claim 10, wherein the video capture device comprises a mobile phone or tablet.

12. The system of claim 10, further comprising a storage configured to store the adjusted captured video.

13. The system of claim 10, further comprising a transmitter for transmitting the adjusted captured video to a second device with video display capability.

14. A system of encoding a video captured on a video capture device at two orientations, comprising:
    means for reading orientation data from the video capture device as a video of a scene is being captured when the video capture device is in a first orientation, wherein the first orientation has a first resolution;
    means for determining that the video capture device is rotated to a second orientation as the video of the scene is being captured, wherein the second orientation has a second resolution;
    means for reading orientation data from the video capture device as a video of the scene is being captured when the video capture device is in the second orientation;
    means for generating a rotation matrix based on a relationship between the first orientation and the second orientation;
    means for adjusting the orientation of frames of the video captured when the video capture device is in the second orientation to match the orientation of the video captured when the video capture device is in the first orientation;

means for cropping the adjusted frames of the video captured when the video capture device is in the second orientation, the cropped frames having the first resolution; and means for encoding the cropped frames of the captured video.

15. The system of claim 14, wherein the means for reading orientation data comprises an inertial measurement unit configured to provide orientation data.

16. The system of claim 14, wherein the means for generating a rotation matrix based on the inertial measurement unit data comprises a rotation module configured to be operated by a processor.

17. The system of claim 14, wherein the means for encoding the rotated captured video comprises a video encoder.

18. A non-transient computer readable medium configured to store instructions that when executed by a processor perform a method comprising:

reading orientation data for a first orientation from a video capture device as a video of a scene is being captured, wherein the first orientation has a first resolution;

determining that the video capture device is rotated to a second orientation as the video of the scene is being captured, wherein the second orientation has a second resolution;

reading orientation data from the video capture device as a video of the scene is being captured when the video capture device is in the second orientation;

generating a rotation matrix based on a relationship between the first orientation and the second orientation;

adjusting the orientation of frames of the video captured when the video capture device is in the second orientation to match the orientation of the video captured when the video capture device is in the first orientation such that the video remains encoded at the first orientation after the video capture device moves to the second orientation;

cropping the adjusted frames of the video captured when the video capture device is in the second orientation, the cropped frames having the first resolution; and encoding the cropped frames of the captured video.

19. The computer readable medium of claim 18, wherein the orientation data is inertial measurement data from an accelerometer or a gyroscope.

20. The computer readable medium of claim 18, wherein the orientation data is accelerometer data.

* * * * *